UNITED STATES PATENT OFFICE.

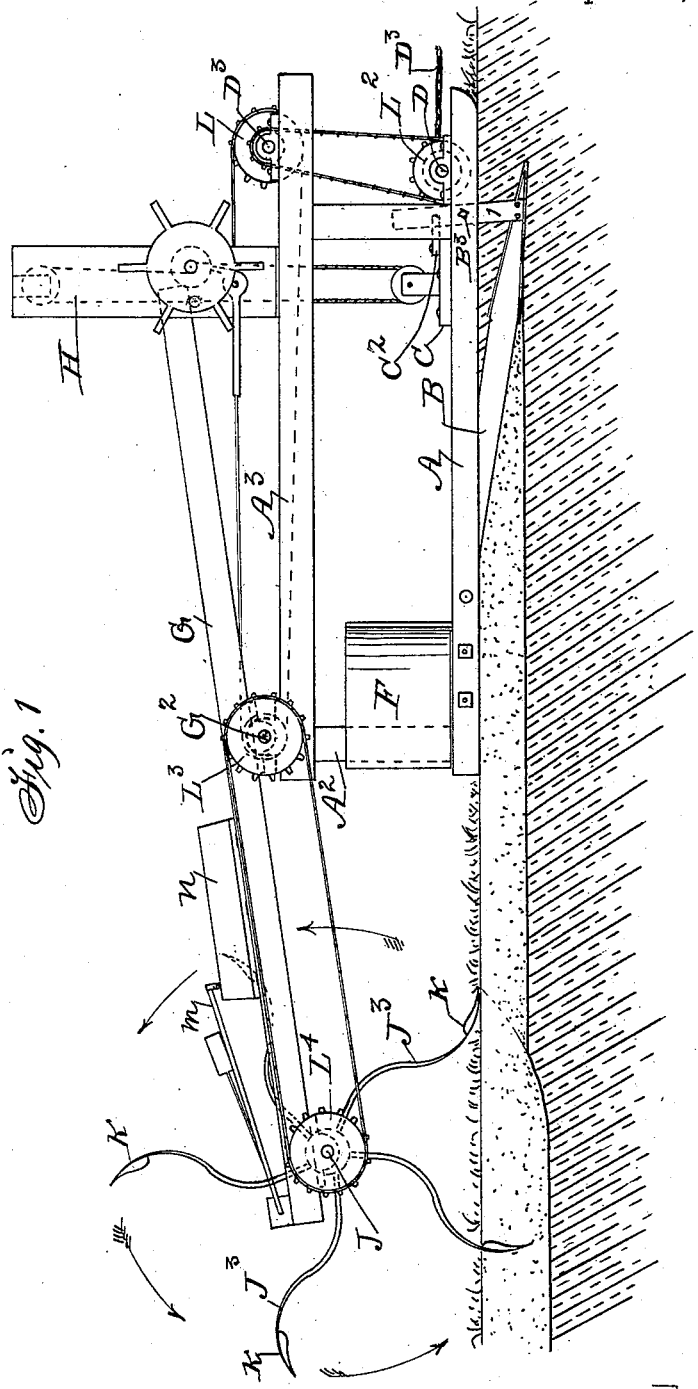

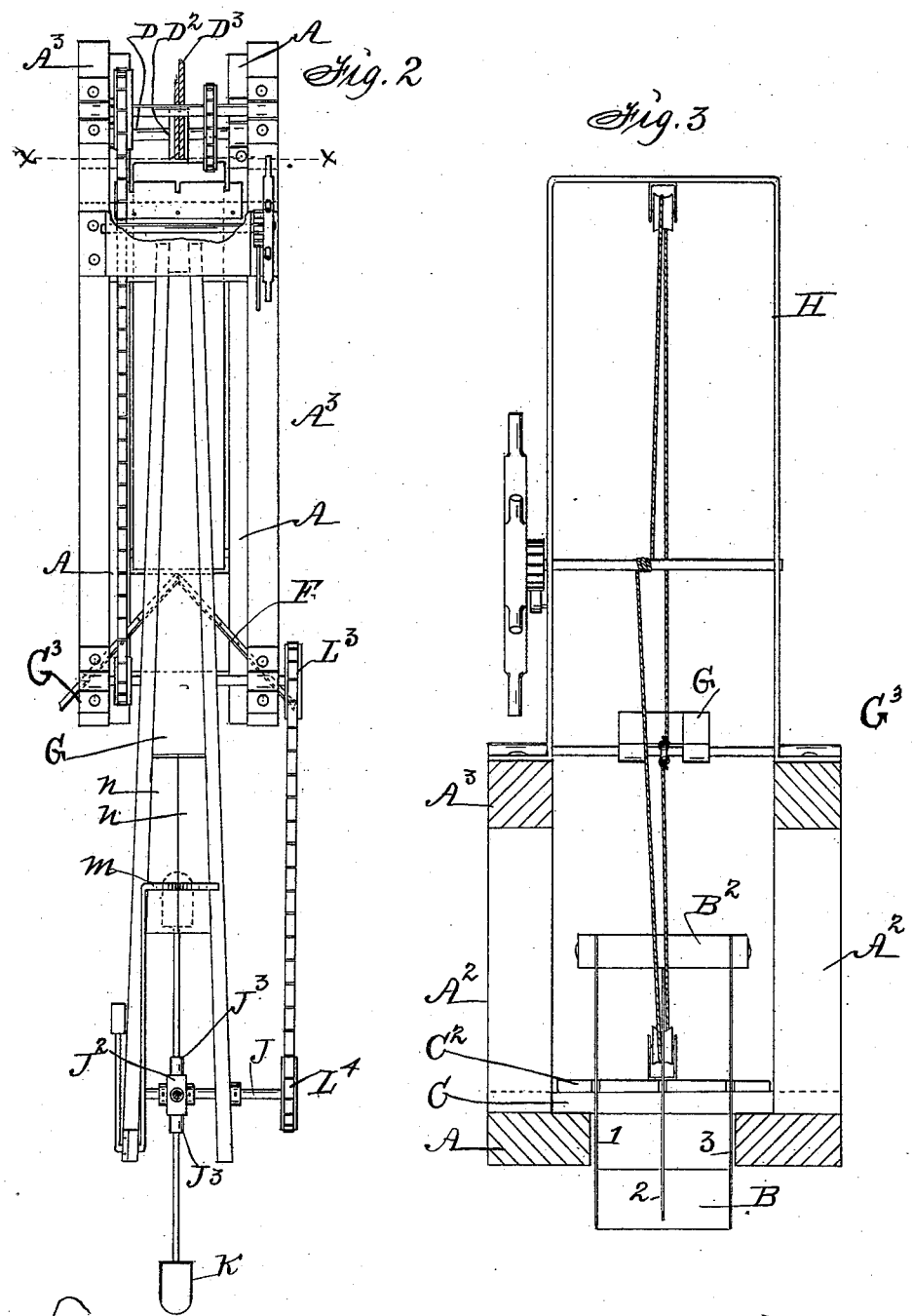

THOMAS DANSKIN, OF MARSHALLTOWN, IOWA.

OPEN AND TILE DITCHING-MACHINE.

SPECIFICATION forming part of Letters Patent No. 361,348, dated April 19, 1887.

Application filed August 3, 1886. Serial No. 209,921. (No model.)

*To all whom it may concern:*

Be it known that I, THOMAS DANSKIN, a citizen of the United States of America, and a resident of Marshalltown, in the county of Marshall and State of Iowa, have invented an Improved Ditching-Machine, of which the following is a specification.

My object is to combine an adjustable plow and a rotary spader with a sliding frame and driving mechanism in such a manner that the plow will divide a furrow-slice and elevate and place it on the surface at the opposite sides of a ditch and the rotary spades will follow the plow and deepen the ditch and carry ground from the bottom of the ditch and place it on the surface at the opposite sides of the open ditch as required to prepare a ditch for drain-tile.

I accomplish the results contemplated as hereinafter set forth, pointed out in my claims, and illustrated in the accompanying drawings, in which—

Figure 1 is a side view of my machine in position as required for practical use. Fig. 2 is a top view; and Fig. 3 an enlarged transverse vertical section through the line $x$ $x$ of Fig. 2, showing the mechanism for raising and lowering the point of the plow.

A A are the wooden base-pieces and runners of the sliding frame or carriage. They may vary in dimensions, as desired, and are rigidly connected by cross-pieces.

$A^2$ are uprights rigidly fixed on top of the base-pieces, and $A^3$ are side pieces fixed on top of the posts.

B represents a plow, that is made of a straight wooden beam pointed at its front end and the point covered with steel plate, and its rear end pivoted between the rear portions of the base-pieces A in such a manner that its front end can be raised and lowered, as required, to make ditches of different depths. Set-screws $B^3$, extended through the frame, serve to fasten the plow and cutters at any point of elevation desired.

1, 2, and 3 are cutters, fixed to the front end of the plow to project upward, one at each side and one in the center of the plow. They are connected at their top ends by means of a cross-piece, $B^2$.

C is a cross-piece fixed on top of the base-pieces A.

$C^2$ is a metal plate that has three slots in its front edge, that is fixed on top of the cross-piece C in such a manner that the rear edges of the cutters 1 2 3 will enter the slots, to be braced thereby when in operation, and also guided therein when raised and lowered with the plow.

D is an axle in metal bearings fixed on top of the front ends of the base-pieces A.

$D^2$ is an iron pulley fixed to the axle D.

$D^3$ represents a rope or chain, coiled twice around the pulley $D^2$, and connected with a capstan in such a manner that power can be applied to the machine by means of a capstan, as required, to advance the sliding carriage and to operate the plow and the rotary spader connected therewith.

F represents a V-shaped mold-board fixed across the tops of the parallel base-pieces A, at their rear ends, in such a manner that the divided furrow-slice that is produced by the point of the plow and the three cutters, and elevated upon the inclined plane and top surface of the plow, will be turned in opposite directions by the mold-board, as required, to place the loose ground on the opposite sides of the ditch as the machine is advanced.

G is a beam pivoted to the rear ends of the side pieces, $A^3$, of the sliding frame by means of a metal axle, $G^2$, journaled in metal bearings $G^3$. Its rear end is forked and carries a rotary spader. Its front end is adjustably connected with the sliding frame by means of a winch or worm-gear in such a manner that it can be readily raised and lowered and retained at any point of elevation desired.

H is a frame fixed on top of the sliding frame, to support a winch or other suitable mechanism for adjusting the pivoted beam G.

J is the axle of a rotary spader, in metal bearings fixed to the forked end of the beam.

$J^2$ is a hub fixed to the axle J. It has five or more radial projections and sockets, into which are fixed arms $J^3$, that carry spades $k$ on their ends in such a manner that they will loosen and elevate ground from the bottom of the ditch made by the plow, as required to deepen the ditch. The spades are preferably of concavo-convex shape and the arms curved, as shown in Fig. 1. The length of the arms must correspond with the height of the sliding frame, and the width of the spades with the width of the plow.

L is a sprocket-wheel on an axle that has its bearings fixed on top of the front end of the sliding frame. It is connected with the axle D by means of a sprocket-wheel, L², fixed to that axle and a drive-chain in such a manner that power will be transmitted from the axle D to the wheel L.

L³ is a sprocket-wheel on the axle G², connected with the wheel L by means of a chain, and L⁴ a sprocket-wheel on the axle J of the rotary spader, connected with the wheel L³, to transmit power from the wheel L to the rotary spader as the machine is advanced by means of a capstan.

The rotary speed of the spader may be governed, as desired, by varying the diameters of the wheels.

$m$ is a spade-cleaning device carried on the end of an arm, $m'$, that is pivoted to the rear end of the forked beam G in such a manner that the device $m$ will scrape the top surface of each spade $k$ as it rises above the forks of the beam, as required, to drop the ground elevated thereby upon a platform on top of the beam. The center of motion of the scraper $m$, carried by the arm $m'$, is eccentric to the center of the rotary spades, so that each spade can lift the scraper as it comes in contact therewith and while the scraper is pushing the ground off from the spade.

$n$ $n$ are the two wings of a platform, hinged to the forks of the beam in such a manner that they will rest flat to receive the ground dropped from a scraper and to be turned upward and outward by each loaded spade as it rises up between the forks of the beam, as required, to throw the ground thereon to the opposite sides of the ditch.

From the foregoing description of the construction and function of each element and sub-combination of the machine, the unitary actions of all the parts and the practical operation of my complete invention will be obvious to all persons familiar with ditching-machines.

I am aware that three cutters have been combined with a plow to cut and divide a furrow-slice. I am also aware that a V-shaped device has been combined with a plow having three cutters to throw the divided furrow-slice in opposite directions; but my manner of pivoting a plow to a sliding frame so that it can be raised and lowered at its front end and fixing a V-shaped mold-board to the same frame at the rear end of the pivoted plow, so that the plow can be let down to loosen and elevate ground from a deep ditch while the V-shaped mold-board remains above the surface, is novel and greatly advantageous.

I claim as my invention—

1. In a ditching-machine, the combination of a beam carrying a rotary spader on forks at its rear end with the rear end of a sliding frame and a plow pivoted to the lower and central portion of the same frame, mechanism for adjusting said beam, and a device for fixing the pivoted plow at any inclination desired, substantially as shown and described, to operate in the manner set forth, for the purposes stated.

2. The rotary plow consisting of a forked beam, G, the shaft J, the hub J², and the arms J³, carrying spades $k$, in combination with a sliding frame carrying a plow and the shaft D, having a fixed pulley, D², and cable D³, to operate in the manner set forth, for the purposes stated.

3. The spade-cleaning device $m$ $m'$, in combination with the forked beam G, carrying a rotary spading device, J, J², and J³, substantially as shown and described, for the purposes specified.

4. The sectional hinged platform $n$ $n$, in combination with the forked and pivoted beam G and a spade-cleaning device, $m$ $m'$, to operate in the manner set forth, for the purposes stated.

5. The improved ditching-machine comprising the following elements, to wit: a sliding frame, a plow pivoted between the runners of the said frame, cutters fixed to the front end of the plow, a forked beam carrying a rotary spader, a device for fixing the pivoted plow at any inclination desired, and mechanism for operating the rotary spader as the plow is advanced, substantially as shown and described, for the purposes stated.

THOMAS DANSKIN.

Witnesses:
WM. FISHER,
G. M. WEEKS.